(12) United States Patent
Hou (10) Patent No.: US 6,563,783 B1
(45) Date of Patent: May 13, 2003

(54) LOWER INERTIAL COMPACT DISC DRIVE

(75) Inventor: Chien-Tzu Hou, Fremont, CA (US)

(73) Assignee: Geneticware Co., Ltd., Tortola (VG)

( * ) Notice: Subject to any disclaimer, the term of this patent is extended or adjusted under 35 U.S.C. 154(b) by 0 days.

(21) Appl. No.: 09/988,087

(22) Filed: Nov. 19, 2001

(51) Int. Cl.⁷ .................. G11B 17/00; G11B 21/16; G11B 3/40; G11B 3/14
(52) U.S. Cl. ........................ 369/244; 369/177
(58) Field of Search .................. 369/244, 249, 369/251, 254, 215, 176, 177

(56) References Cited

U.S. PATENT DOCUMENTS

| | | | | | |
|---|---|---|---|---|---|
| 3,193,295 A | * | 7/1965 | Isemura | .................. | 369/177 |
| 4,284,279 A | * | 8/1981 | Mori | .................. | 369/177 |
| 4,498,160 A | * | 2/1985 | Koiki | .................. | 369/177 |
| 4,541,086 A | * | 9/1985 | Tanaka | .................. | 369/270 |
| 5,870,249 A | * | 2/1999 | Yanagisawa | .................. | 360/101 |
| 5,894,460 A | * | 4/1999 | Yanagawa et al. | ....... | 369/13.37 |

\* cited by examiner

*Primary Examiner*—William Klimowicz
*Assistant Examiner*—Julie Anne Watko
(74) *Attorney, Agent, or Firm*—Rosenberg, Klein & Lee (57) ABSTRACT

A lower inertial compact disc drive includes a rotary needle, a rotary driving device and a straight movement device. The rotary needle is installed below a read and written surface of the disc, and a center of the rotary needle is installed with a fixed reflector. The selected positions at two sides thereof are installed with a movable reflector and a balance block; and a straight movement device for controlling the reflector and the balance block to move oppositely along a straight path on the rotary needle so as to control the alternation of the reading optic path. The rotary driving device has a small inertia, and thus a small power motor may serve the object. Similarly, the movable reflector, convex lens, and balance block are light and a small power servomotor can be used. Consequently, the power is saved greatly.

8 Claims, 7 Drawing Sheets

LOWER INERTIAL COMPACT DISC DRIVE

BACKGROUND OF THE INVENTION

1. Field of the Invention

The present invention relates to a lower inertial compact disc drive, and especially to a disc drive having a small inertia, in that the disc and laser head are retained still. A displacement device alternates the reading and writing positions. Thereby, it is a lower power and lower inertia device.

2. Description of the Related Art

The compact disc drive device is a most frequently used storage medium, which can be approximately divided into three classes: compact disc read only memory (CDROM), CD readable (CDR) and CD readable and writeable (CDRW). In current technology, in reading or writing operation, a CD drive causes that a disc to rotate and the laser head moves reciprocally along a straight path. However, since the inertia of the disc is large, and the laser head and its attachments are heavier and moves reciprocally and frequently, much power is required, the vibration is large and much heat energy is released.

The disc in low speed CD drive moves with a constant linear velocity (CLV). However, the current technology partial constant angular velocity (PCAV) or constant angular velocity (CAV) is used. As the laser head reads or writes data at any position, the motor rotates with a constant speed. To speed the read or write data is to speed the rotation of the motor, this is a conventional way. Currently, some CD drives and DVDROMs use "True X multi-beam" technology that assures that the read speed is constant in whole disc. It is only alternated responsive to the mass of the CD or the operation system employed.

Current technologies for reading data on DVD are not consistent. In the past, to be compatible with CDROMs, DVDROMs, two lasers heads for dual-reading is used. Currently a single lens technology is used. Besides, the digital servo system can be used to realize the automatic adjustment of a CD drive so as to increase the preciseness of reading data. Dual dynamic shock-proof system (DDSS) may be used to reduce the vibration of a compact disc in high speed. Auto balance system (ABS) can be used to retain the compact disc in a horizontal condition so that the reading ability of the CD is increased greatly. Automatic intellectual error correction (AIEC) may greatly increase the amount of data read by the compact disc. By above novel technologies, the performance of compact disc drive is improved. However, in current compact disc drives, the disc rotates with a high speed and the laser head moves reciprocally along a straight path. Since the compact disc has a large inertia and the laser head is heavier, the current CD drive needs a larger power and a large vibration and consumes much power. Thereby, the use of the current CD drive is limited and cannot be used in a personal digital assistant (PDA). PDAs have the functions of calculators, phones, facsimile machines, and networks. These functions are realized wirelessly. The peripherals of PDAs needs low power without much power being released. However, the current CD drive cannot match these requirements due to the large inertia of the disc and the heavier laser head.

SUMMARY OF THE INVENTION

Accordingly, the primary object of the present invention is to provide a lower inertial compact disc drive, wherein the disc and laser head are motionless. The laser beam for writing and reading data is transferred by optic element and a displacement device alternates the reading and writing positions.

In one aspect of the present invention, the displacement device wherein the displacement device comprising: a rotary needle installed below a read and write surface of the disc, a center of the rotary needle is installed with a fixed reflector, and selected positions at two sides thereof are installed with a movable reflector and a balance block; and a straight movement device for controlling the reflector and the balance block to move oppositely along a straight path on the rotary needle so as to control the alternation of the reading optic path.

In one aspect of the present invention, in data reading and writing, the disc and laser head are retained still. By the rotation of the rotary needle and the reciprocal straight path movement of the movable reflector and the balance block, the data at any position can be read and written. The beam from the laser head is transferred to the read and written surface through the fixing reflector and the movable reflector. The beam reflected from the disc reflecting layer returns to the laser head through the original path.

In one aspect of the present invention, the rotary driving device of the present invention has a small inertia, and thus a small power motor may serve the object. Similarly, the movable reflector, convex lens, and balance block are light and a small power servomotor can be used. Consequently, the power is saved greatly and defects in thermal power, vibration and noise can be avoided.

The various objects and advantages of the present invention will be more readily understood from the following detailed description when read in conjunction with the appended drawing.

DETAILED DESCRIPTION OF PREFERRED EMBODIMENT

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

The disc 10 of the present invention is a computer document-storing medium which may be an ISO-9660, Joliet,d Romeo and other document systems.

The present invention includes the following elements.

Figure 1:
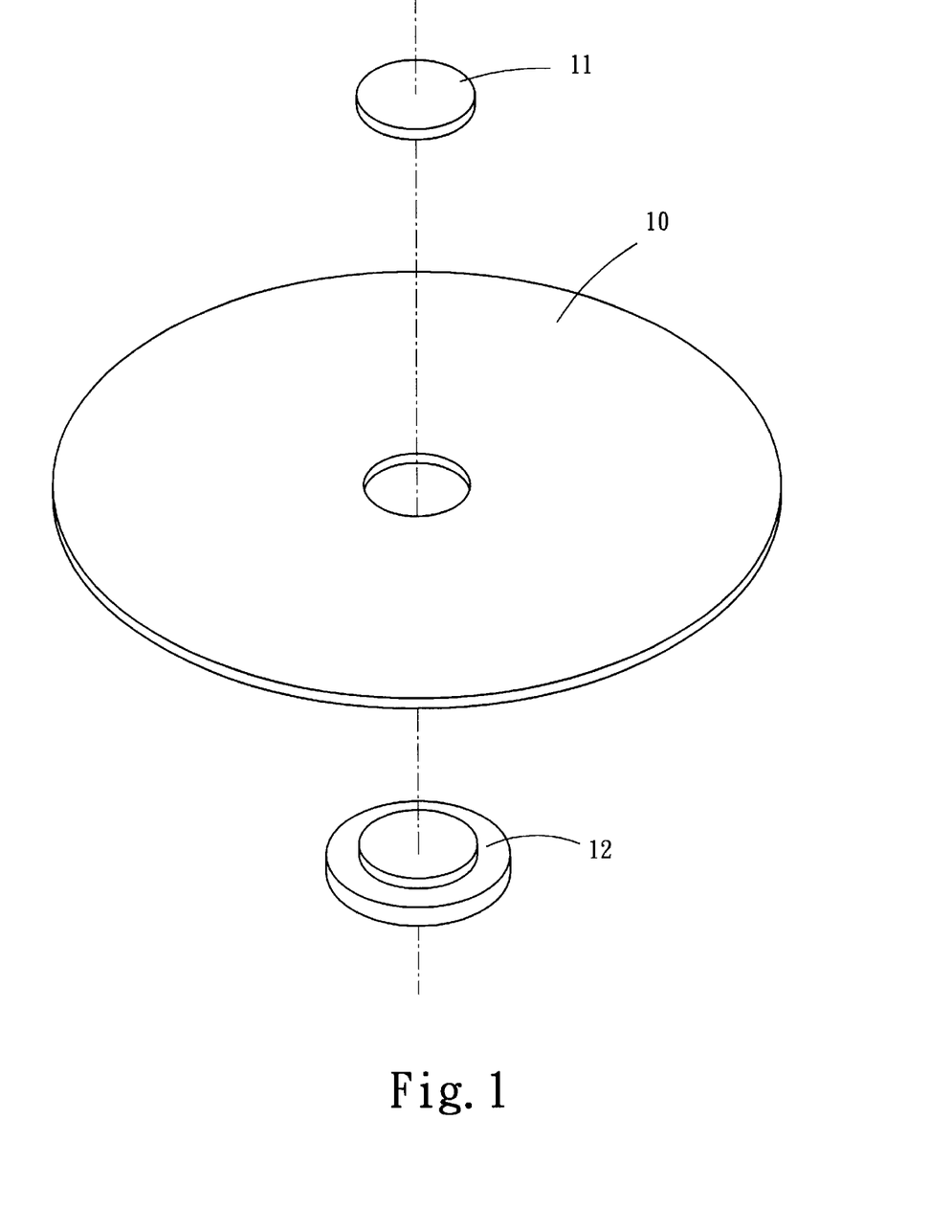
FIG. 1 is a schematic view showing the disc retainer of the present invention.

A disc retainer (referring to FIG. 1) is formed by a disc mounting upper press 11 and a disc lower supporter 12. The disc 10 is placed on the disc lower supporter 12. The upper press 11 tightly presses the disc 10 on the disc lower supporter 12 so that the disc 10 is fixed and thus cannot rotate.

A displacement device serves to control the nodal point's position of the laser beam from a laser head to the disc 10.

A rotary needle 20 (referring to FIGS. 2A and 2B) is installed below the reading and writing surface of the disc 10. A fixing reflector 21 is put on the center of the rotary needle 20. The proper position of the needle's two sides is installed with a movable reflector 22 and a balance block 23. A convex lens 28 for focusing laser light is installed out of the movable reflector 22. Each of two ends of the rotary needle 20 has a light floating wheel 24, the light floating wheel 24 can rotate continuously along the transversal central axis C-D of the rotary needle. When the light floating wheel 24 rotates, it will contact the inner of an annular device 25. The annular device 25 retains still for preventing the rotary needle 20 to tremble greatly as the rotary needle 20 rotates in high speed. Consequently, the rotary needle 20 is controlled in a proper flexible deformation.

Figure 2A:
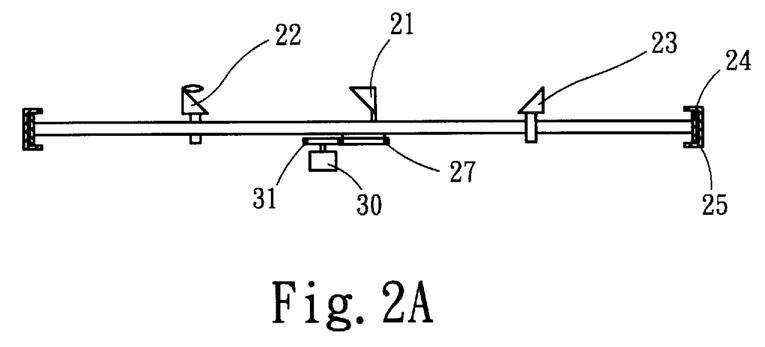
FIG. 2A is a lateral view of the rotary needle and the rotary driving device of the present invention.
Figure 2B:
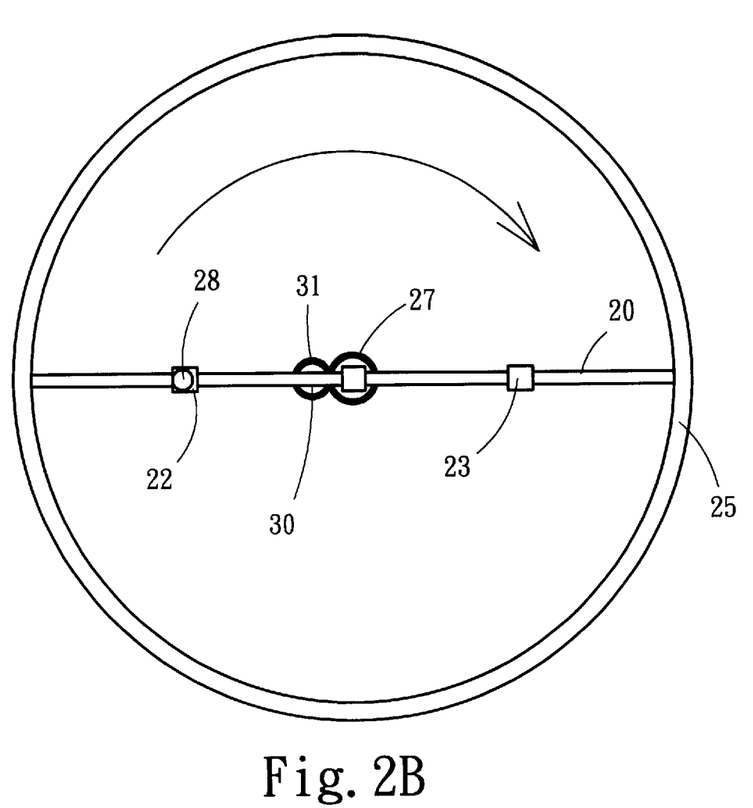
FIG. 2B is a top plan view of the rotary needle and the rotary driving device of the present invention.

Furthermore, the rotary needle 20 has a hole 26 at position with respect to the reflector 21. The lower side of the hole 26 is protruded with a gear 27 integrally formed with the rotary needle 20. A center of the gear 27 is overlapped with the rotary needle 20 for driving the rotary needle 20 to rotate.

A rotary driving device 30 is formed by a driving motor combined with a gear 31. The gear 31 is engaged with the gear 27. The driving motor directly drives the gear 31 to rotate so as to drive the rotary needle 20 to rotate continuously around the central axis A-B of the gear 27.

A straight movement device (FIGS. 3A and 3B) includes the following devices.

Figure 3A:
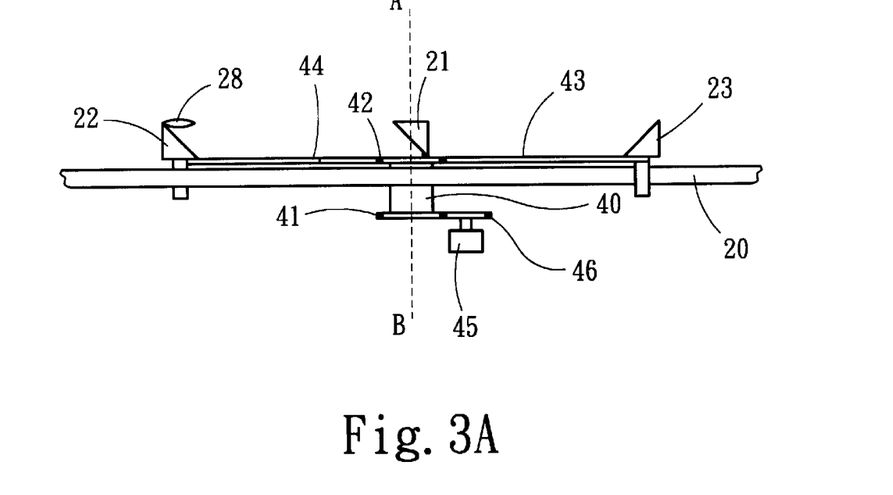
FIG. 3A is a lateral view of the straight movement device of the present invention.
Figure 3B:
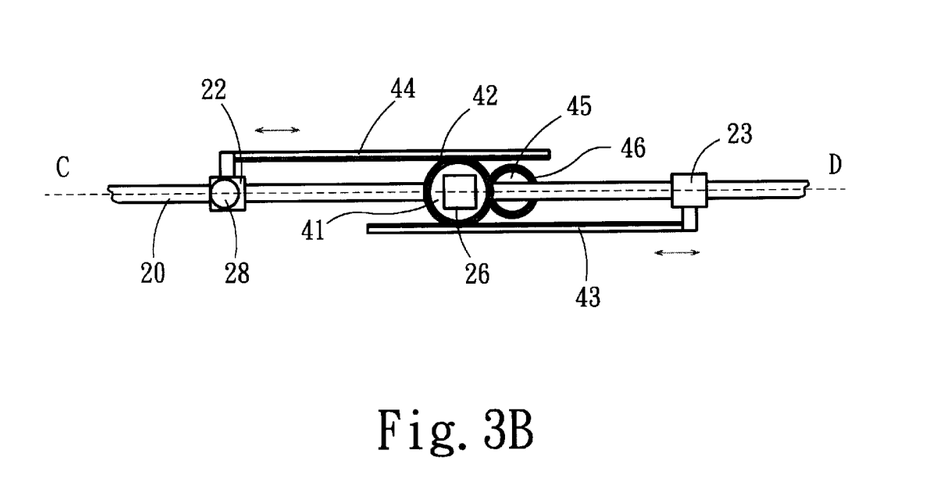
FIG. 3B is a top plan view of the straight movement device of the present invention.

A hollow driving unit 40 is firmly secured to the inner edge of the hole 26. The upper and lower ends thereof are installed with gears 41, 42.

Two racks 43, 44 are installed at two opposite sides of the movable reflector 21 and the balance block 23 and are engaged at two sides of the gear 42 at the upper ends of the hollow driving unit 40.

A server motor 45 is combined with a gear 46. The gear 42 is engaged to the gear 41 at the lower end of the hollow driving unit 40 so as to drive the movable reflector 22 and the balance block 23 to move reciprocally along two opposite directions.

The servomotor 45 drives the gear 46 so as to drive the gear 41 at the lower end of the hole 26 to rotate. Thereby, the gear 42 of the hollow driving unit 40 moves on the racks 43, 44 so that the racks 43, 44 moves oppositely along a straight path. Thereby, the reflector 22, convex lens 28 and the balance block 23 moves reciprocally and oppositely along the C-D direction. The moving direction of the balance block 23 is oppositely to the reflector 22 so as to retain the equilibrium of the rotary needle 20. Thereby, as the rotary needle 20 rotates with a high speed, the whole rotary device may retain in a dynamic equilibrium so as to retain a constant respective angle with the movable reflector 22.

Figure 4:
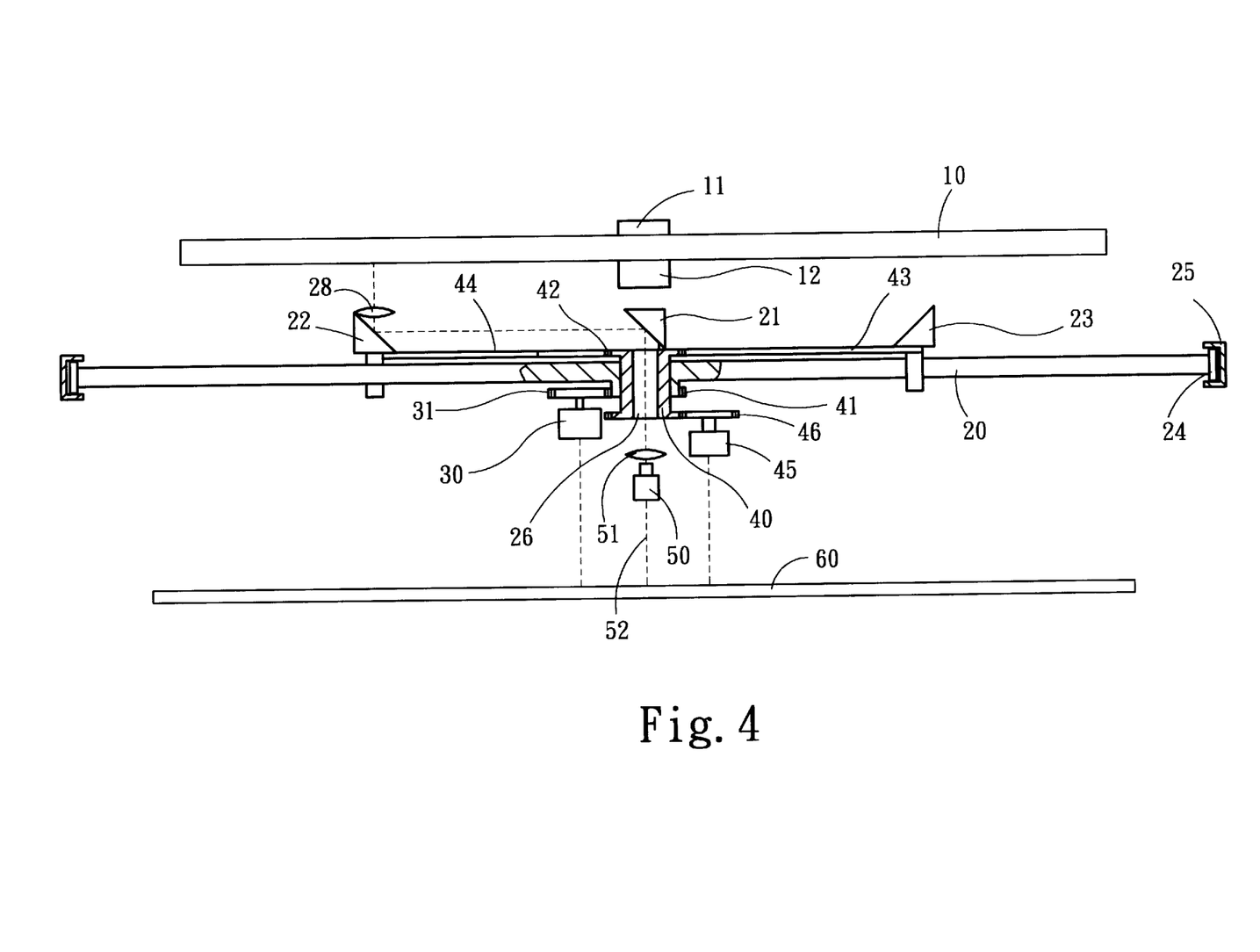
FIG. 4 is a structural schematic view of the present invention.
Figure 5:
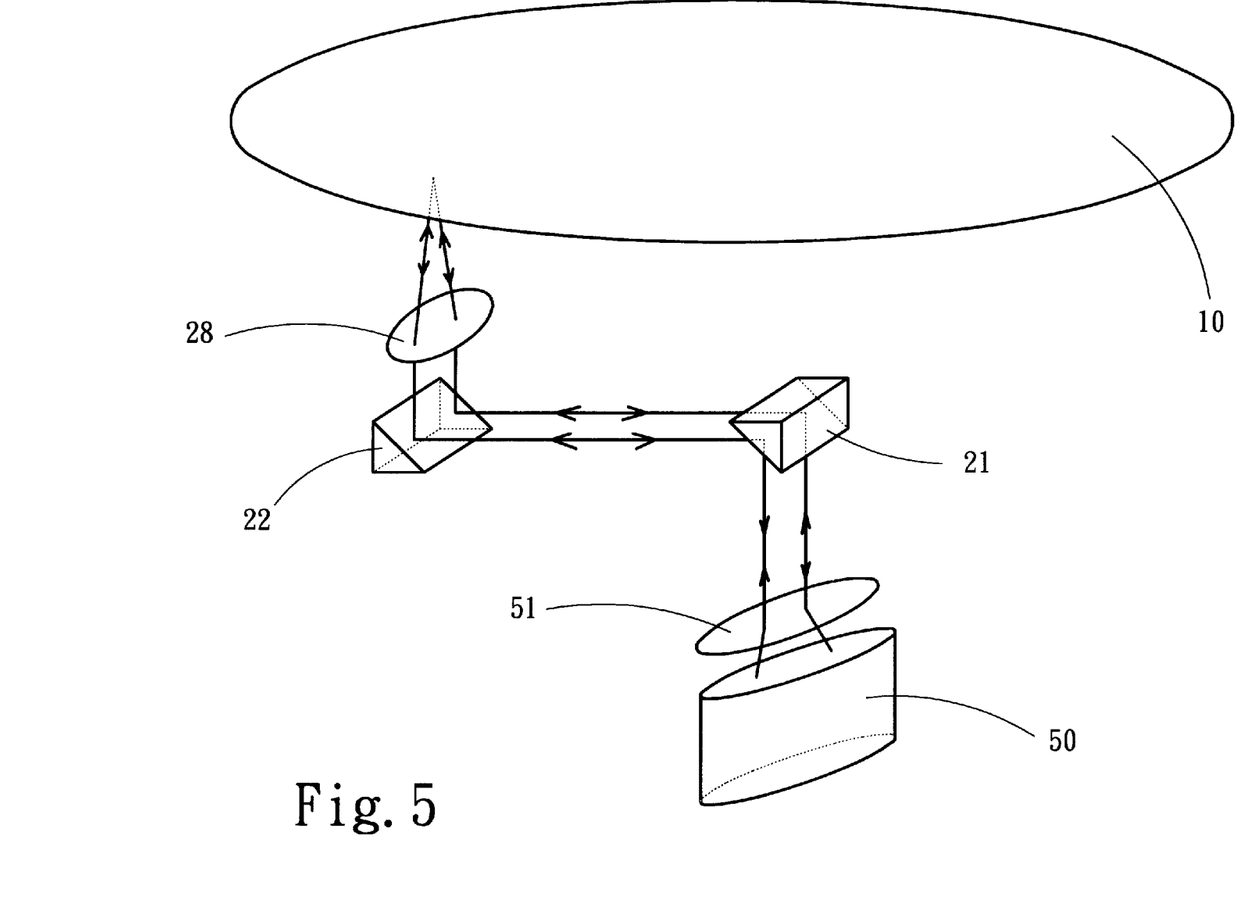
FIG. 5 is a schematic view showing the optical path of the laser head of the present invention.

Referring to FIG. 4, the structural schematic view of the present invention is illustrated. The combinational schematic view of FIGS. 2 and 3 are illustrated. The convex lens 51 for focusing in the laser head 50 is replaced so that the beam from the head is a parallel beam as it incidents into the reflector 23. The laser head 50 is placed vertically. The laser beam emitted from the emitter in the laser head 50 passes through a hollow channel in the hollow transfer unit 40 to the fixed reflector 23. The beam is then reflected by the fixed reflector 23 to become a horizontal beam to be transferred to the movable reflector 22. Then the beam is reflected by the movable reflector 22 to become a vertical beam. Then the beam is focused by the convex lens 28 to radiate to one track of the disc 10. Then it is reflected by a reflecting layer of the disc 10 to return to the convex lens 28 for focusing. Then the beam is reflected by the movable reflector 22 to become a horizontal beam, and then reflected by the fixed reflector 23 to the laser head 50. Then the beam passes through a beam separator (not shown, but like those used in the prior art) in the laser head 50 so that the reflected beam is separated. Then the beam is transferred to a circuit board 60 through a data wire 52 for decoding the data and then identifying the data signal. The circuit board 60 also actuates and controls the rotary driving device 30, the straight movement device and laser head 50. The light path in the laser head 50 is identical to the current technology.

When the rotary needle 20 rotates with a high speed, and the movable reflector 22, convex lens 28, and the balance block 23 moves reciprocally along a straight path, the incident angle of the beam emitted from the emitter of the laser head 50 to the fixing reflector 21 is retained. Similarly, the incident angle of the beam reflected by the fixing reflector 21 to the movable reflector 23 are also retained. The beams reflected by the reflecting layer of the disc 10 is received by the laser head along a fixing light path. To read the data in different positions of the disc 10 is realized by the high-speed rotation of the rotary needle 20 and the synchronous movements of the movable reflector 22. This way for reading and writing data cause that the disc 10 is fixed and the laser head is also fixed as the driver reads and writes data. The data at any position of the disc 10 is read and written by the rotation of the rotary needle 20 and the reciprocal straight movement of the reflector 22, and meanwhile the balance block 23 moves synchronously with the movable reflector 22 so as to assure the dynamic equilibrium of the rotary needle 20. In the reflecting process of the laser light, the divergence of the light is focused by the convex lens 28 and is then cancelled.

Figure 6:
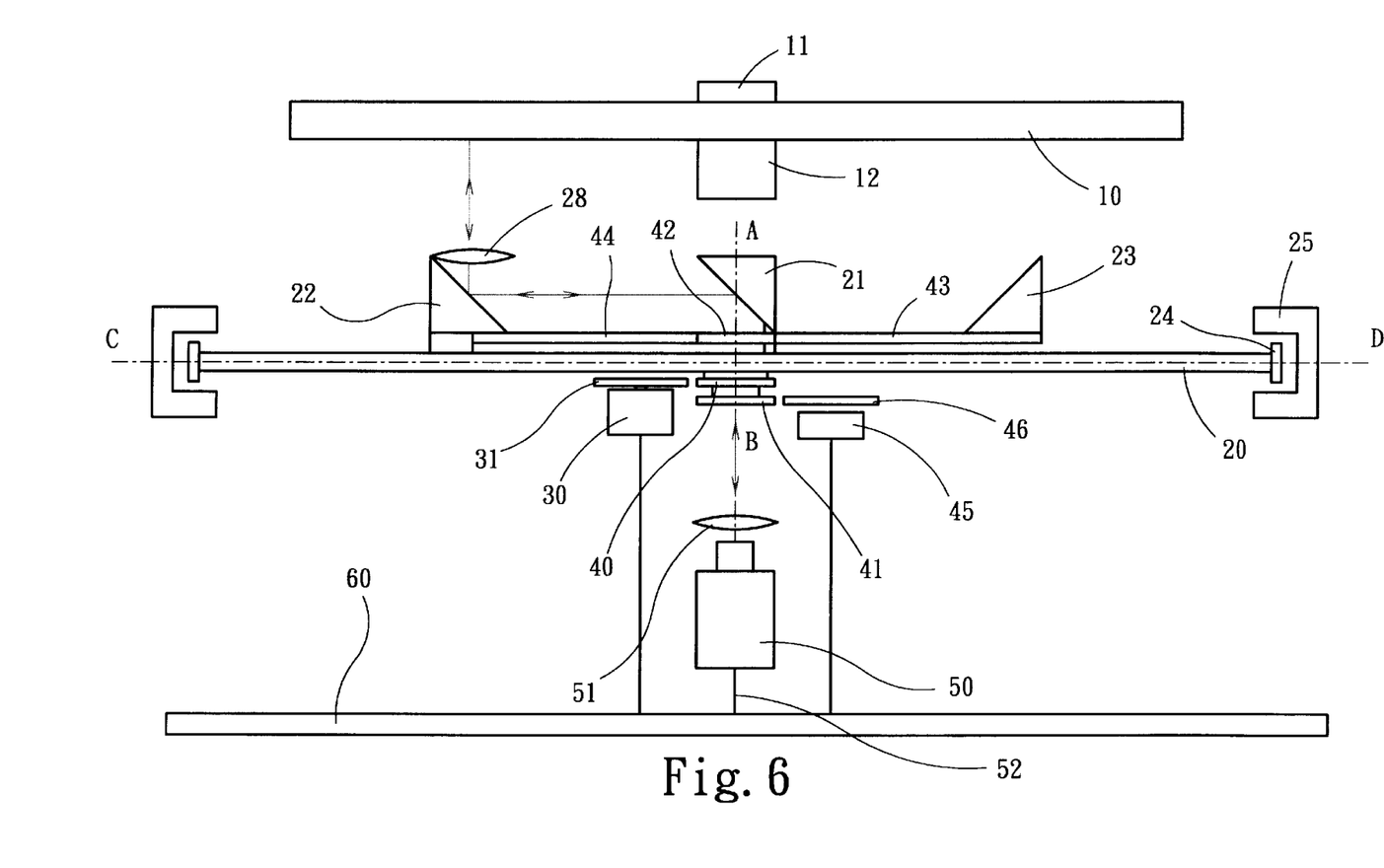
FIG. 6 is a schematic view showing the embodiment of the present invention.
Figure 7:
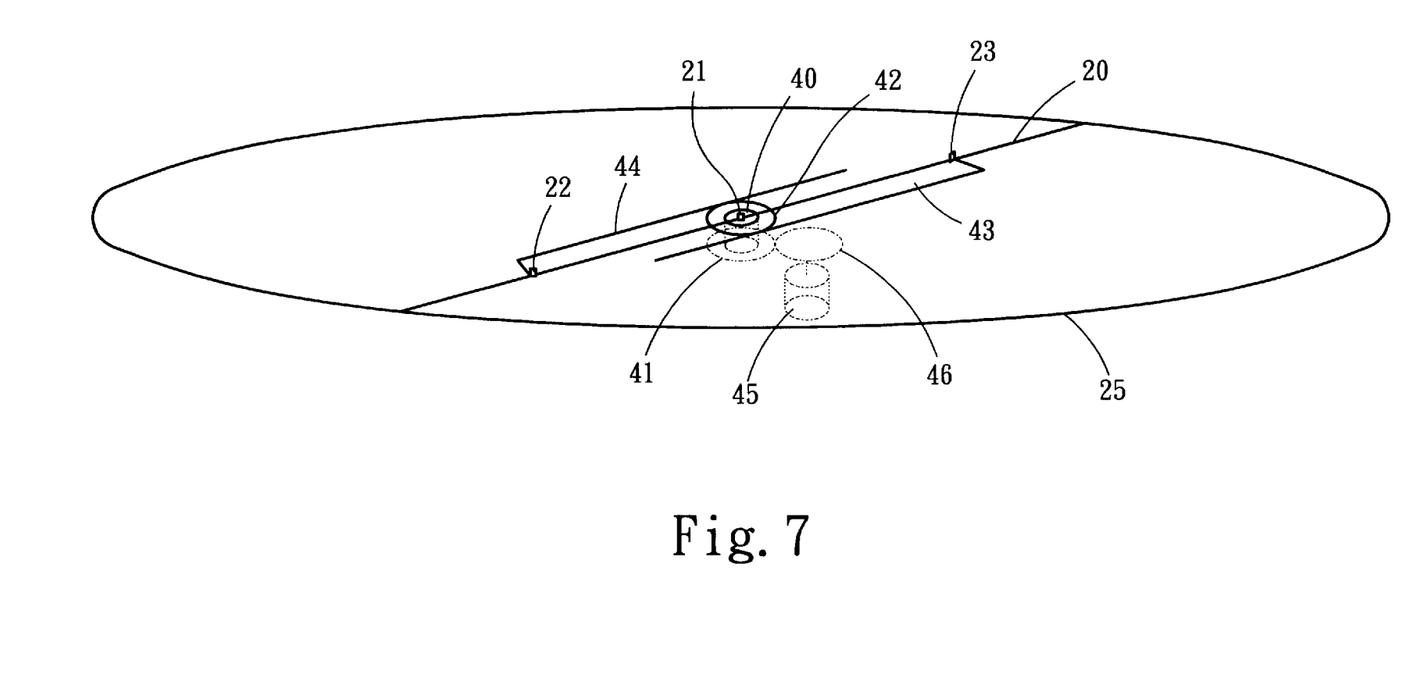
FIG. 7 is a top plan view of FIG. 6.

Referring to FIGS. 6 and 7, the present invention will be further described.

After the disc 10 is placed in the disc fixing device, the upper press 11 tightly fixes the disc 10 so that the disc 10 can not rotate. When the compact disc drive starts working, by the engagement of the gears 27 and 31, the rotary needle 20 rotates with a high speed along an axis of central axis A-B of the gear 27. At the time that the rotary needle 20 rotates with a high speed, the movable reflector 22, fixed reflector 21, and balance block 23 rotates with the rotary needle 20 in a high speed, and the same time, the movable reflector 22 and the balance block 23 moves reciprocally with a straight line oriented at the direction of line C-D. Then, the whole rotation means is retained in an equilibrium condition. The convex lens 28 is integrally formed with the movable reflector 22. The movements of the movable reflector 22 and the balance block 23 are realized by a servomotor 45 and a driving means formed by gear 46 and racks 43 and 44. The fixing reflector 21 moves synchronously with the rotary needle 20 in a high speed so as to retain a fixed angle with respect to the reflector 22. Thus, the beam from the laser head 50 is firstly reflected by the reflector 21 to a movable reflector 22. Then the beam is focused by the convex lens 28 to radiate to one track of the disc 10. Each beam reflected from the reflecting layer of the disc 10 passes through the convex lens 28, movable reflector 22 and fixing reflector 21, and then is received by the laser head 50. Then it is transferred by the data line 52 to the circuit board 60 for identifying the data.

Moreover, at the time that the gears 27, 31 drives the rotary needle 20 to move with a high speed, the hollow driving unit 40 concentrically mounted with the gear 27 will not be effected. The upper and lower gears 41, 42 thereof is matched to the gear 27 so that the friction force is small enough. Therefore, when the gears 41, 42 and 46 drives the movable reflector 22, fixed reflector 21, and balance block 23, the rotation of the gear 27 is not effected.

The reciprocal straight path movement of the reflector 22 and the balance block 23 is realized by the servomotor 45. The servomotor 45 drives the gear 41, racks 43 and 44 to engage the gear 42 so that the movable reflector 22 may move reciprocally with the balance block 23 along a straight path. At the time that the movable reflector 22 moves along a straight path, the balance block 23 is adjusted for assuring the dynamic equilibrium of the rotary needle 20. The light floating wheel 24 at two ends of the rotary needle 20 may rotate continuously along the axis of line C-D. At this time, an outer edge of the light floating wheel 24 is in contact with the inner wall of the limit device 25 for preventing the rotary needle 20 from a lager tremble and a large flexibility in high speed rotation. Furthermore, the rotary needle 20, rotatable reflector 22, fixing reflector 21, and balance block 23 have shapes with streamline profiles for reducing the air resistance of the rotary needle 20. In the present invention, the rotation of the compact disc drive passing through the rotary needle 20 and the reciprocal straight path movement of the movable reflector 22 will cause that the beam emitted from the laser head 50 may be emitted to any position of the disc 10. Thereby, the data at any position of the disc 10 can be read and written. The current ways of the rotation of the compact disc drive and the reciprocal straight path movement of the laser head are alternated.

The advantage of the present invention is lower power requirement, small vibration, low noises, low releasing power from the compact disc drive, simple structure, and the maintenance work is easy. Besides, the control circuit board 60 of the present invention is those employed in the prior art. The circuit board for control the disc 10 in the prior art can be used to control the rotation of the rotary needle 20. The prior circuit for control the laser head 50 and the auxiliary circuit to move reciprocally may be used to control reciprocally straight path movement of the movable reflector 22 of the rotary needle 20. Therefore, no new circuit board and chips is required to be developed. Consequently, the cost is reduced.

In the present invention, the lower inertial compact disc drive of the present invention can improved the defects of the prior art, such as large inertia, high power consumption, etc.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A lower inertial compact disc drive comprising:
   a fixed laser head;
   a disc retainer for fixing a disc; and
   a displacement device for displacing a reading position and a writing position,
   wherein the displacement device comprising:
   a rotary needle installed below a read and written surface of the disc, a center of the rotary needle is installed with a fixed reflector, and selected positions at two sides thereof are installed with a movable reflector and a balance block; and
   a straight movement device for controlling the reflector and the balance block to move oppositely along a straight path on the rotary needle.

2. The lower inertial compact disc drive as recited in claim 1, wherein the disc retainer includes a disc mounting upper press and a disc lower supporter for fixing the disc.

3. The lower inertial compact disc drive as recited in claim 1, wherein the center of the rotary needle has a hole, a lower side of the rotary needle is installed with a first gear which is integrated with the rotary needle.

4. The lower inertial compact disc drive as recited in claim 3, wherein a rotary driving device is formed by a driving motor combining with a second gear, and the second gear is engaged with the first gear.

5. The lower inertial compact disc drive as recited in claim 3, wherein the straight movement device comprising:
   a hollow driving unit being installed in an inner edge of the hole, an upper and lower ends thereof being installed with respective third gears; the third gears are concentrically and matched with the first gear so that the rotations of the two third gears are not effected by one another;
   two racks installed at two lateral sides of the reflector and the balance block and engaged to two sides of the third gears of the hollow driving unit;
   a servomotor engaged with a fourth gear which is engaged with the third gears at the lower end of the hollow driving unit for driving reflector and the balance block to move reciprocally along a straight path.

6. The lower inertial compact disc drive as recited in claim 1, wherein a convex lens for focusing a laser light is installed out of the movable reflector.

7. The lower inertial compact disc drive as recited in claim 1, wherein two ends of the rotary needle are installed with respective floating wheels.

8. The lower inertial compact disc drive as recited in claim 7, wherein the floating wheel rotates on and is in contact with an annular confining device for preventing overlarge trembles as the rotary needle rotates with a high speed and controlling flexibility of the rotary needle.

* * * * *